United States Patent [19]

McElheny

[11] 4,231,985

[45] Nov. 4, 1980

[54] METHOD OF CONNECTING WIRE LEADS TO MINIATURE COIL ASSEMBLIES

[75] Inventor: Donald C. McElheny, Delevan, N.Y.

[73] Assignee: American Precision Industries, Inc., Buffalo, N.Y.

[21] Appl. No.: 748,933

[22] Filed: Dec. 9, 1976

[51] Int. Cl.³ ............................................. B29C 6/04
[52] U.S. Cl. .................................. 264/262; 264/263; 264/272; 336/192; 336/208
[58] Field of Search ............... 264/272, 261, 262, 263, 264/267; 336/192, 198, 208, 210

[56] References Cited

U.S. PATENT DOCUMENTS

| 1,859,248 | 5/1932 | Strait | 264/272 |
|---|---|---|---|
| 2,687,260 | 8/1954 | Morin | 264/263 |
| 2,942,302 | 6/1960 | Beyer | 264/272 |
| 3,339,609 | 9/1967 | Cushman | 264/261 |
| 3,374,538 | 3/1968 | Murray | 264/272 |
| 3,978,581 | 9/1976 | Mivra | 264/272 |

*Primary Examiner*—James B. Lowe

*Attorney, Agent, or Firm*—Christel, Bean & Linihan

[57] ABSTRACT

The invention relates to a method of fastening electrical wire leads to each end of a ferromagnetic sleeve or core form in a manner whereby significantly greater bonding strength is provided between the leads and the core as compared to prior art methods. The core and wire leads are placed in a molding cavity into which molding material is injected so as to affirmatively fill the clearance between the lead ends and the core thereby resulting in a highly effective cementing of one to the other. The core body is hollow so that the molding material passes through each end to completely fill the central portion of the core. In this manner the central bore through the core body provides effective gating to the injected molding material. The ferromagnetic coil article so formed includes a molded flange on each of its ends which extend radially outward from the outer surface of the core body associated therewith. The flanges serve to protect a coil winding disposed therebetween about the core from a variety of conditions.

5 Claims, 10 Drawing Figures

U.S. Patent  Nov. 4, 1980  Sheet 1 of 2  4,231,985
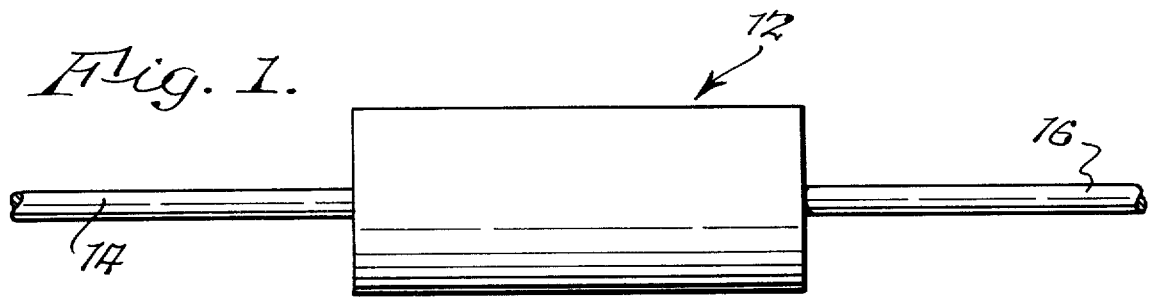
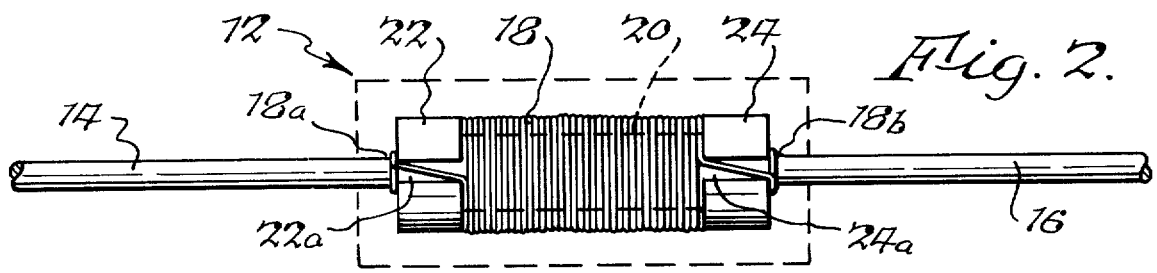
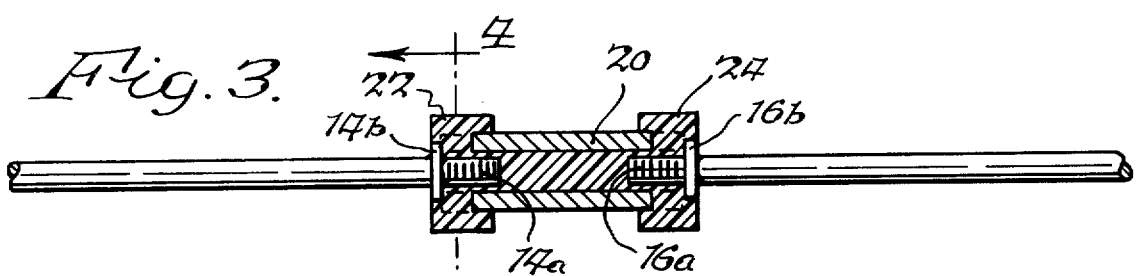
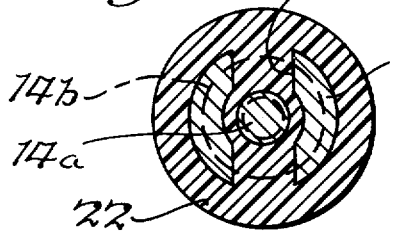
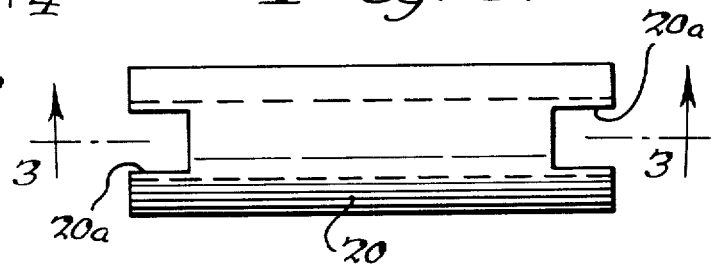
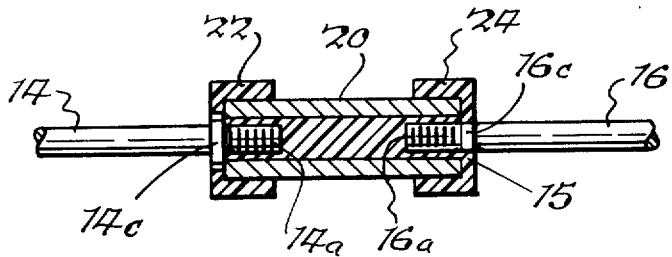
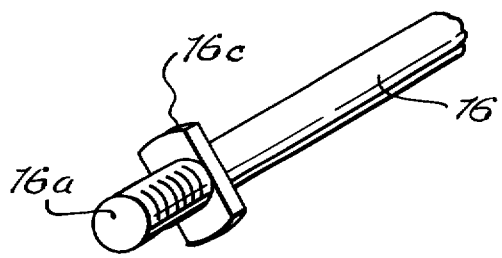

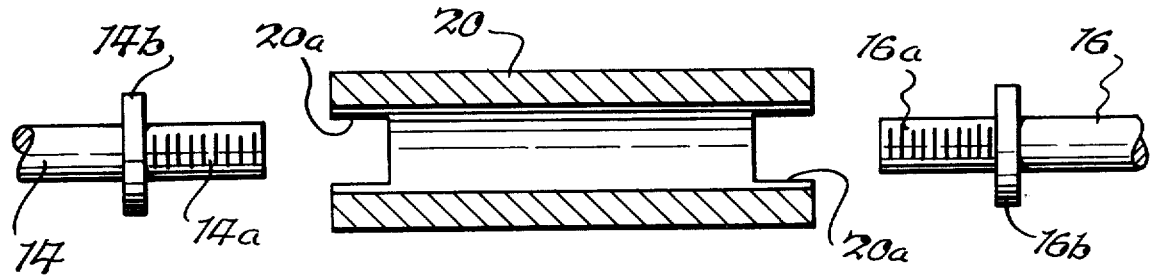
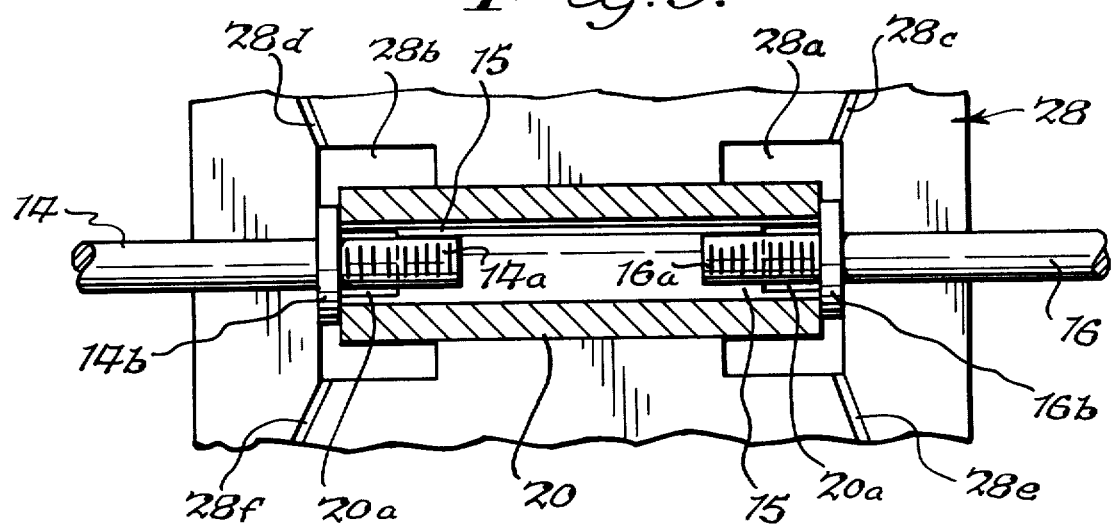
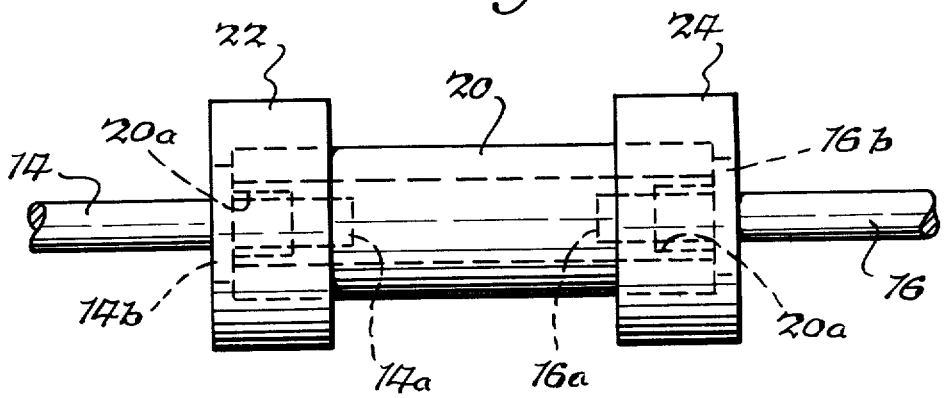

METHOD OF CONNECTING WIRE LEADS TO MINIATURE COIL ASSEMBLIES

BACKGROUND OF THE INVENTION

This invention relates to a method of fastening an electrical conductor lead to each end of a ferromagnetic body or core for use in a coil assembly. The aforesaid method provides for cementing the leads to the core form in a highly effective manner as compared to prior art methods while providing the resultant structure with molded flanges on its ends to protect a coil winding disposed about the outer surface of the core form between such flanges.

Furthermore, the present invention is particularly adapted for use in the manufacture of miniature coil assemblies wherein necessarily small diameter wire leads are employed in combination with ultra-fine coil wire having a diameter on the order of one to two mils in diameter.

One of the critical problems encountered in the manufacture of miniature coils as considered hereinabove is the occurrence of loose connections between the ends of the wire leads and the ferromagnetic core body associated therewith. Should the lead ends be subject, for example, to relative rotation with respect to the core body, it becomes a distinct possibility that the connection between the fine coil wire and the leads may become broken rendering the coil assembly inoperable. Necessarily, the potential breaking of the connection between the leads and the coil winding is also a possibility should the mechanical connection between the lead and the core body be loose or defective in an axial sense. A further problem encountered in the prior art relates to protecting a fine coil winding from solder and flux splash and general process handling, for example.

The prior art has considered various methods for cementing the ends of wire leads into the opposite ends of a ferromagnetic core. Such methods have involved the provision of a closed end cavity in each end of the core in which a liquid adhesive is employed to make a bond between the lead end and the body. Usually, an upset shoulder is provided inwardly from the extreme end of the lead to abut up against the axial end face of the core form when the former is inserted into the latter. After dipping a lead end into the aforesaid liquid adhesive and inserting the same into a cavity in the end face of the core, the assembly is placed usually on a tray with other similar assemblies for transfer to an oven for curing. The mechanical fit between the inside diameter of the core cavity or aperture and the outside diameter of the lead is critical so as to maintain concentricity between the wire lead and the core. Since this method of assembly is normally performed as a manual operation it results in variations in the amount of adhesive provided for bonding whereby weak bonds have been encountered while excessive amounts of adhesive have cause lead contamination outside of the bonding area.

Furthermore, it has been recognized in the prior art that it is advantageous to provide a flange at each end of the core body which extends outwardly in a radial direction with respect thereto. Such flanges act as heat shields to protect fine coil windings disposed therebetween from solder flux splash, provided resistance to springing of coil windings and provide, in general, mechanical protection during handling of the device. In addition, such flanges provide mechanical centering for coils requiring an additional sleeve for electromagnetic shielding. The prior art has provided such flanges as an integral part of the magnetic core body which necessarily results in a more complex core body.

SUMMARY OF THE INVENTION

Accordingly, one object of the present invention is to provide a new and improved method for fastening or, more specifically, cementing wire lead ends to an associated ferromagnetic core or body assembly in a manner yielding improved lead bond strength to withstand processing temperatures without degradation.

Another object of the present invention is to assemble wire leads to a core assembly whereby the leads include superior pull and twist strength characteristics while improved concentricity is provided between the leads and the core body.

A further object of the present invention is to provide the aforesaid assembly procedure by means of machine process control rather than manual control so as to yield uniform bonds in a coil assembly operation.

Still another object of the present invention is to provide the aforesaid method which utilizes a molding procedure for which adequate gating is provided so as to eliminate the possibility of voids in the bonding material which is applied by such molding procedure.

Yet still another object of the present invention is to provide a coil assembly having a molded flange at each end of a ferromagnetic body whereby such flanges provide protection to a wire coil disposed about the outer midportion of the body.

In summary, the present invention provides a method for molding the ends of electrical conductor leads into the opposite ends of a ferromagnetic core or body assembly. More specifically, a core body in the form of a hollow sleeve is employed having a through-bore and into each end of which is placed a lead end. Each lead has an upset shoulder spaced longitudinally from its axial end point and which is adapted to abut against the axial end face of the core body. The resulting subassembled structure is placed in an appropriate molding cavity whereby a molding or adhesive material is introduced into the areas at the ends of the core body. A portion of the upset lead shoulder may be removed as well as a portion of the wall of the core at its end so as to provide sufficient gating for the injected molding material to pass into the bore of the ferromagnetic body so as to completely fill the same. in addition to the gating referred to hereinabove, the open bore through the core body functions to insure that the injected molded material will be sufficiently gated so as to afirmatively bond the lead ends to the core. The present invention further provides a finished coil assembly having molded flanges about the outer surface of the core body on both of its ends. The flanges extend radially outward therefrom. As discussed hereinabove, the flanges function to provide protection to the wire coil disposed about the outer midportion of the core.

The foregoing and other objects, advantages, and characterizing features of the present invention will become clearly apparent from the ensuing detailed description of a preferred embodiment thereof, taken together with the accompanying drawings wherein like reference characters denote like parts throughout the various views.

BRIEF DESCRIPTION OF THE DRAWINGS

FIG. 1 is a side elevational view of a fully assembled coil assembly formed by the method disclosed in the present invention;

FIG. 2 is a view similar to FIG. 1 illustrating the internal construction of a coil assembly with an outer molded casing shown in dotted line form;

FIG. 3 is a longitudinal view in section taken about in part on line 3—3 of FIG. 5 illustrating lead wire ends molded into a ferromagnetic core prior to the assembly of a wire coil about the outer surface of the core;

FIG. 4 is a transverse view in section taken about on line 4—4 of FIG. 3;

FIG. 5 is an isolated view of a ferromagnetic core with cutouts provided in the wall at the end portions thereof for purposes of providing gating in the molding process practiced in the present invention;

FIG. 6 is a view similar to FIG. 3 illustrating the use of truncated shoulders on the lead wire ends; and FIG. 7 is a view of a typical lead wire illustrating a truncated shoulder on the head wire end; and FIGS. 8, 9, and 10 are illustrations of the sequential steps practiced in the present invention to affix or bond the lead ends to a ferromagnetic core.

DETAILED DESCRIPTION OF THE INVENTION

Referring in detail to the illustrative embodiment of a coil assembly depicted in FIG. 1, there is shown a totally finished coil assembly 12 having electrical wire leads 14 and 16 bonded to each of its ends. As further shown in FIG. 2, coil assembly 12 includes a wire coil 18 disposed about a cylindrical ferromagnetic core 20. The core or cylindrical body 20 includes flanges 22 and 24 extending radially outward from the outer surface thereof and between which the coil 18 is disposed. The flanges 22 and 24 respectively include cutout portions 22a and 24a through which the adjacent ends of coil 18 pass to be soldered to the adjacent wire leads at 18a and 18b.

Turning now to a consideration of FIGS. 3 through 7, FIG. 3 shows a hollow cylindrical sleeve or core body 20 having flanges 22 and 24 molded thereon and which are integrally connected to one another by the molding or adhesive material passing through the central bore of core 20 from one end thereof to the other. The molding material encapsulates the lead headers which are those portions indicated as 14a and 16a located adjacent to the upset shoulders 14b and 16b. The lead headers as shown are serrated and may be formed so as to be non-circular in order to resist rotational as well as axial movement with respect to the molding material in which they are encapsulated. The molding material totally fills the clearance between the outer surface of the headers 14a and 16a and the inner surface of core body 20. The molding material forming flanges 22 and 24 overlaps the ends edges of core body 20 in a longitudinal sense so as to increase its surface contact therewith so as to more effectively resist relative movement with respect to the core body.

In viewing FIGS. 3 through 5 collectively, it is to be understood that the core body 20 includes openings or cutouts 20a which extend through the wall of the core to provide gating for the molding process to be more fully described hereinbelow. As viewed in FIGS. 3 and 4, the upset shoulders 14b and 16b are of greater diameter than the inside diameter of core body 20 and thereby overlie the respectively adjacent end openings therein. By provision of the openings 20a in the core body, unrestricted access may be had to the central portion thereof for the injection of molded material and the venting thereof during the molding process whereby the configuration of the molded material as shown in FIG. 3 may be uniformly provided.

As an alternative to the gating provided by the core body configuration as shown in FIG. 5, or as a potential addition thereto, the upset shoulder 16c on a lead as shown in FIG. 7 may be truncated so as to provide a clearance opening extending past the shoulder on the lead and through the axial end face opening in a core body when the lead and core are subassembled. As viewed in FIG. 6, the clearance opening between the shoulder 16c and the inner surface of the core body 20 is indicated at 15. Necessarily, this clearance is not apparent when viewing the left hand end of the core body since the lead shoulder 14c adjacent thereto is oriented or rotated 90° with respect to lead shoulder 16c at the right hand end of the core.

In manufacturing the coil as described hereinabove, reference will be had to FIGS. 8 through 10. As shown in FIG. 8, a core body 20 similar to that shown in FIG. 5 having end openings 20a is subassembled with lead ends 14 and 16 with such subassembly being placed in a mold as shown in FIG. 9. The mold 28 in FIG. 9 includes two molding cavities, 28a and 28b into which the respective end portions of the subassembled core and lead ends are placed. Molding material may be introduced into the molding cavities through passages 28c and 28d, respectively. The molding material may then pass through the cutout openings 20a and the clearances 15 into the inner mid portion of the core 20. Necessarily, the molding material passing inwardly from each end of the core eventually meets and subsequently back fills throughout the length of the core 20 to completely fill molding cavities 28a and 28b whereby the molded product as shown in FIG. 10 results. The internal bore through body 20 insures that proper venting takes place during the molding process while excessive molding material which is injected into the mold is removed through the passages 28e and 28f.

It is also to be understood that, for example, passages 28d and 28e could be closed off with molding material injected through 28c passing longitudinally through the hollow central portion of core 20. Excessive molding material would pass through passage 28f resulting in the product shown in FIG. 10.

The above molding procedure results in improved concentricity between the lead ends and the cylindrical core body due to the self-centering nature of the molding process. As referred to hereinabove, the molded flanges 22 and 24 which overlap the end portions of the core body provide protection to a coil disposed about the outer surface of the core and increase the bond strength between the leads and such core body.

From the foregoing, it is apparent that the object of the present invention has been fully accomplished. As a result of this invention, a much improved method for fastening or cementing wire lead ends to an associated ferromagnetic body assembly is provided. By this method improved lead bond strength is provided so as to withstand processing ternperatures without degradation. In addition, the repetitive accuracy of a machine operation can be realized as opposed to prior art manual procedures. Lastly, the coil article so formed by the present invention may utilize a standard cylindrical core having molded flanges at each of its ends as opposed to utilizing a relatively more expensive core having integral end flanges formed thereon.

Having thus described an illustrated preferred embodiment of my invention, it will be understood that such description and illustration is by way of example only and that such modifications and changes as may suggest themselves to those skilled in the art are intended to fall within the scope of the present invention as limited only by the appended claims.

I claim:

1. A method for fastening an end of an electrical wire lead to each open end of a coil core having a through bore extending between its open ends comprising the steps of:
   providing a mold to receive each end of said core, said mold forming a cavity about each end of said core;
   disposing an electrical lead in the mold cavity at each end of the core, each said lead having a shoulder adjacent its end, each said lead end being of smaller dimension than said bore to provide a clearance between the outer surface of each lead end and the bore surface and positioned coaxially with and extending into said bore with said lead shoulder abutting the core end;
   providing a gate communicating between the mold cavity and the bore at each end of said core; and
   injecting molding material into said cavity with sufficient pressure so that said clearance becomes filled with said molding material whereby said lead becomes firmly affixed to said coil core to resist axial and rotational movement relative thereto.

2. The method of claim 1 wherein each said shoulder is truncated to thereby provide said gate.

3. The method as set forth in claim 2 wherein said lead ends are non-circular in transverse cross section so as to resist rotation relative to said molding material.

4. The method of claim 1 wherein each end of said core is notched to thereby provide said gate.

5. A method as set forth in claim 4 wherein said lead ends are non-circular in transverse cross section so as to resist rotation relative to said molding material.

* * * * *